United States Patent
Tian et al.

(10) Patent No.: US 12,436,003 B2
(45) Date of Patent: Oct. 7, 2025

(54) SYSTEM TO MEASURE COIL LOCATIONS AND LENGTHS ON AERIAL FIBER CABLES BY DISTRIBUTED FIBER SENSING FOR DECISION MAKING

(71) Applicant: NEC Laboratories America, Inc., Princeton, NJ (US)

(72) Inventors: Yue Tian, Princeton, NJ (US); Yangmin Ding, East Brunswick, NJ (US); Sarper Ozharar, Pennington, NJ (US); Shaobo Han, Princeton, NJ (US); Ting Wang, West Windsor, NJ (US); Jiatong Li, Piscataway, NJ (US); Zhuocheng Jiang, Plainsboro, NJ (US); Yuanda Xu, Jersey City, NJ (US)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 18/316,208

(22) Filed: May 11, 2023

(65) Prior Publication Data
US 2023/0366703 A1 Nov. 16, 2023

Related U.S. Application Data

(60) Provisional application No. 63/341,441, filed on May 13, 2022, provisional application No. 63/341,453, filed on May 13, 2022.

(51) Int. Cl.
*G01D 5/353* (2006.01)
*G01H 9/00* (2006.01)
*G06N 20/00* (2019.01)

(52) U.S. Cl.
CPC ......... *G01D 5/35358* (2013.01); *G01H 9/004* (2013.01); *G06N 20/00* (2019.01)

(58) Field of Classification Search
CPC ..... G01D 5/35358; G01H 9/004; G06N 20/00
See application file for complete search history.

(56) References Cited

U.S. PATENT DOCUMENTS

| | | | | |
|---|---|---|---|---|
| 4,818,064 A * | 4/1989 | Youngquist | ............ | G01H 9/004 250/227.27 |
| 5,355,208 A * | 10/1994 | Crawford | ............. | G08B 13/186 356/35.5 |
| 7,947,945 B2 * | 5/2011 | Bookbinder | ....... | G01D 5/35358 356/73.1 |
| 10,697,806 B2 * | 6/2020 | Koste | ................. | G01D 5/35329 |
| 10,979,140 B2 * | 4/2021 | Mansouri Rad | ... | H04B 10/0779 |
| 11,585,692 B2 * | 2/2023 | Kiesel | ..................... | G01L 1/246 |
| 2010/0092182 A1 * | 4/2010 | Sarchi | ............... | H02J 13/00017 398/168 |

(Continued)

*Primary Examiner* — David J Bolduc
(74) *Attorney, Agent, or Firm* — Joseph Kolodka

(57) ABSTRACT

A distributed fiber optic sensing (DFOS)/distributed acoustic sensing (DAS) system and method employing a fiber optic sensor cable that collects vibrational data of individual utility poles suspending the fiber optic sensor cable and stores the vibrational data in a central office (CO). Machine learning (ML) models are developed, trained, and utilized to analyze vibrational features of the utility poles and determine their integrity. Additionally, DFOS/DAS systems and methods according to the present disclosure determine the location(s) of fiber coils that exist along a length of a fiber optic sensor cable.

5 Claims, 7 Drawing Sheets

(56) References Cited

U.S. PATENT DOCUMENTS

| | | | |
|---|---|---|---|
| 2011/0292763 A1* | 12/2011 | Coates | G01V 1/18 367/25 |
| 2013/0028555 A1* | 1/2013 | Dailey | G01D 5/35316 385/12 |
| 2013/0113629 A1* | 5/2013 | Hartog | G01V 1/226 340/853.2 |
| 2014/0123759 A1* | 5/2014 | Minto | F17D 5/005 73/592 |
| 2014/0362668 A1* | 12/2014 | McEwen-King | B61L 23/06 367/118 |
| 2015/0346053 A1* | 12/2015 | Lally | G01M 11/3145 356/477 |
| 2016/0191163 A1* | 6/2016 | Preston | G01L 1/242 398/16 |
| 2017/0076563 A1* | 3/2017 | Guerriero | G06F 16/245 |
| 2017/0146409 A1* | 5/2017 | Hadley | G01K 3/10 |
| 2018/0259385 A1* | 9/2018 | Cedilnik | G01H 9/004 |
| 2018/0354534 A1* | 12/2018 | Cole | B61L 25/025 |
| 2019/0225250 A1* | 7/2019 | Esprey | B61L 1/06 |
| 2020/0271811 A1* | 8/2020 | Wilson | G01V 1/52 |
| 2020/0291772 A1* | 9/2020 | Thiruvenkatanathan | E21B 47/18 |
| 2020/0313763 A1* | 10/2020 | Wang | H04B 10/25753 |
| 2021/0156734 A1* | 5/2021 | Johnston | E21B 47/107 |
| 2021/0173111 A1* | 6/2021 | Therrien | E21B 47/113 |
| 2021/0310836 A1* | 10/2021 | Huang | G01D 5/35338 |
| 2021/0310858 A1* | 10/2021 | Huang | G01K 11/32 |
| 2021/0388716 A1* | 12/2021 | Cerrahoglu | G01K 11/32 |
| 2021/0397994 A1* | 12/2021 | Cerrahoglu | E21B 47/00 |
| 2021/0405232 A1* | 12/2021 | LeBlanc | G01V 1/226 |
| 2022/0120925 A1* | 4/2022 | Tian | G01V 1/001 |
| 2022/0196461 A1* | 6/2022 | Hu | G01H 9/004 |
| 2022/0228458 A1* | 7/2022 | Jaaskelainen | E21B 33/1208 |
| 2022/0279287 A1* | 9/2022 | Hu | H04R 23/008 |
| 2022/0333956 A1* | 10/2022 | Han | G01H 9/004 |
| 2022/0333976 A1* | 10/2022 | Cuenot | G01D 21/02 |
| 2022/0341319 A1* | 10/2022 | Duthie | E21B 43/103 |
| 2022/0397450 A1* | 12/2022 | Richards | B65G 15/30 |
| 2023/0160742 A1* | 5/2023 | Ellwood | G01D 5/35364 356/73.1 |
| 2024/0255662 A1* | 8/2024 | Lindsey | G01V 1/226 |

* cited by examiner

SYSTEM TO MEASURE COIL LOCATIONS AND LENGTHS ON AERIAL FIBER CABLES BY DISTRIBUTED FIBER SENSING FOR DECISION MAKING

CROSS-REFERENCE TO RELATED APPLICATIONS

This application claims the benefit of U.S. Provisional Patent Application Ser. No. 63/341,441 filed May 13, 2022, and United States Provisional Patent Application Ser. No. 63/341,453 filed May 13, 2022, the entire contents of each are incorporated by reference as if set forth at length herein.

FIELD OF THE INVENTION

This application relates generally to distributed fiber optic sensing (DFOS)/distributed acoustic sensing (DAS) systems, methods, and structures and machine learning (ML) technologies. More particularly, it pertains to utility pole integrity assessment using DAS and machine learning using environmental noise data and determining locations of fiber coils along a length of aerial fiber optic cable.

BACKGROUND OF THE INVENTION

Utility pole integrity is critical for both utility infrastructure operation and public safety. Currently, utility pole integrity inspection requires well-trained inspectors/staffs to perform inspections in the field, including visual inspection, hammer test, digging around the pole and drilling into the pole for sampling. This inspection procedure needs to be done on every pole individually. Thus, it is labor intensive, time consuming, subjective, highly depending on the inspector experience and invasive to the pole structure.

Additionally, aerial fiber optic cables are used to provide communication services to both residential and commercial locations of service provider customers. During deployment—to accommodate future drop points, branches, and repairs, telecommunications service providers oftentimes reserve fiber cable as coils distributed along a fiber optic cable route. However, the recorded lengths and locations of these fiber coils are oftentimes inaccurate or out-of-date. Therefore, it is beneficial for telecommunications carriers to precisely know the location(s) of these coils without undergoing a time consuming and labor intensive operation.

SUMMARY OF THE INVENTION

An advance in the art is made according to aspects of the present disclosure directed to a distributed fiber optic sensing (DFOS)/distributed acoustic sensing (DAS) system and method that collects vibrational data from individual utility poles and stores the vibrational data in a central office (CO). Machine learning (ML) models are developed and utilized to analyze vibrational features of the utility poles and determine their integrity. Additionally, DFOS/DAS systems and methods according to the present disclosure determines the location(s) of fiber coils that exist along a length of a fiber optic cable.

In sharp contrast to the prior art, systems, and methods according to aspects of the present disclosure provide for the autonomous determination of utility pole integrity by a ML model which advantageously eliminates any human-introduced subjectivity. As a result, utility pole inspections and integrity determinations are more efficient, less costly, and more objective.

Systems and methods according to the present disclosure advantageously assess utility pole integrity by using existing telecommunications fiber optic cable—that may simultaneously convey live telecommunications traffic, random environmental noise, DFOS/DAS technology, and a machine learning model.

Operationally, the random environmental noise produces vibrations in a target utility pole whose vibrational signal is picked up by the fiber optic cable mounted on the target utility pole, and subsequently detected/recorded by DFOS/DAS. By applying the designed machine learning model on the DAS signals, the target pole's integrity condition is obtained.

The machine learning model is trained with known integrity conditions of training poles and their DAS signals excited by the random environmental noise. The machine learning model classifies the DAS signals into corresponding pole integrity condition classes. Then the pre-trained model is used for pole integrity assessment by classifying the DAS signals from test poles into different integrity condition classes.

Viewed from another aspect, disclosed herein are systems and methods that advantageously distinguish the location(s) of fiber coils along a length of an aerial fiber optic cable, which provides accurate length and location results of such coils.

DETAILED DESCRIPTION OF THE INVENTION

Figure 1A:
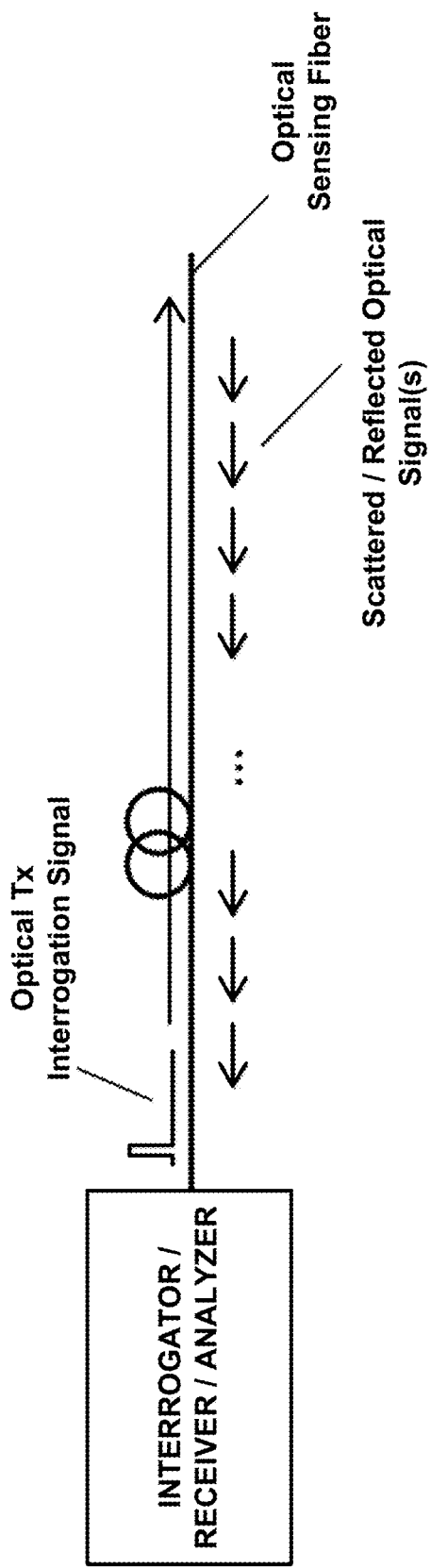
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
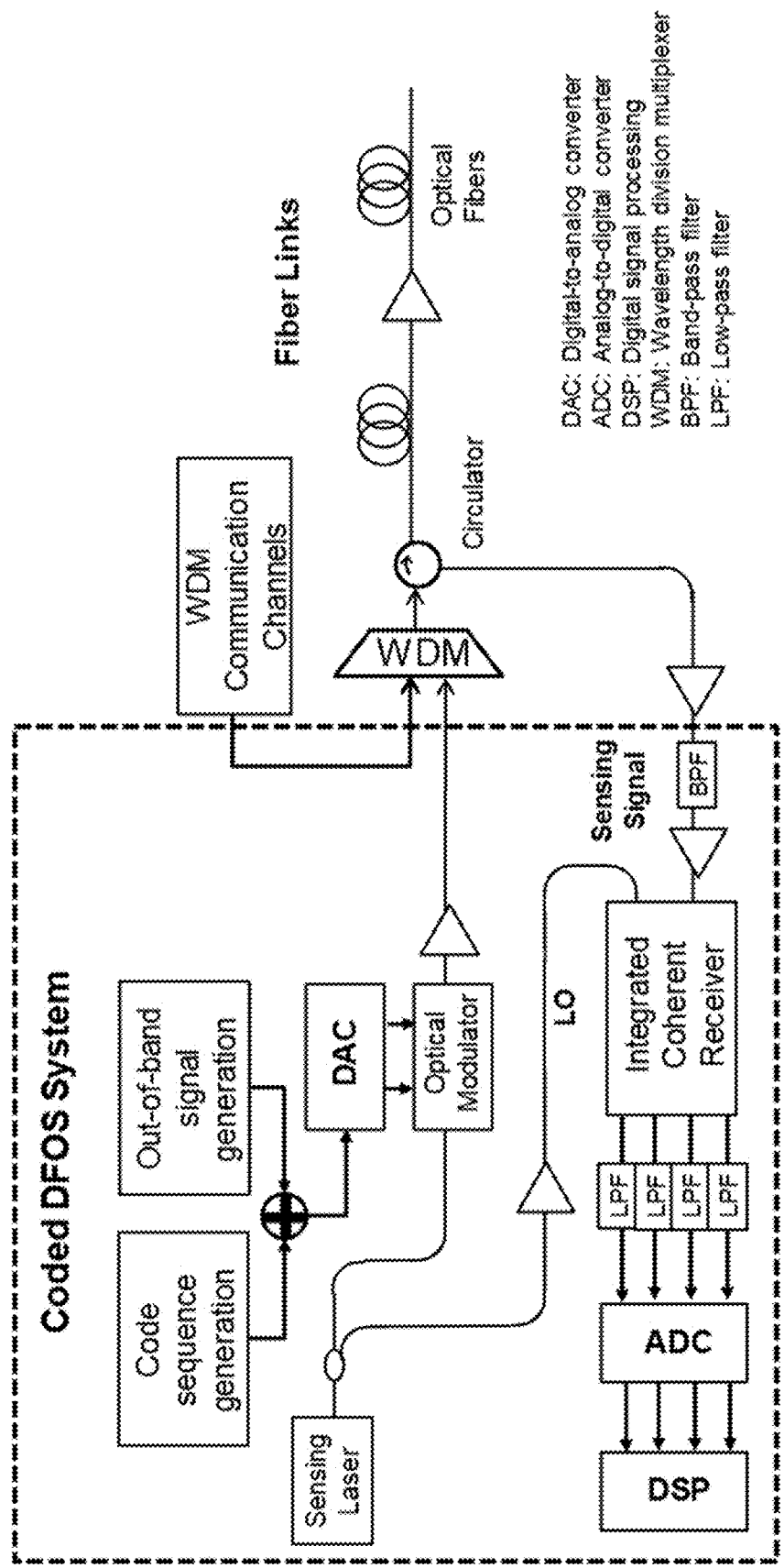

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
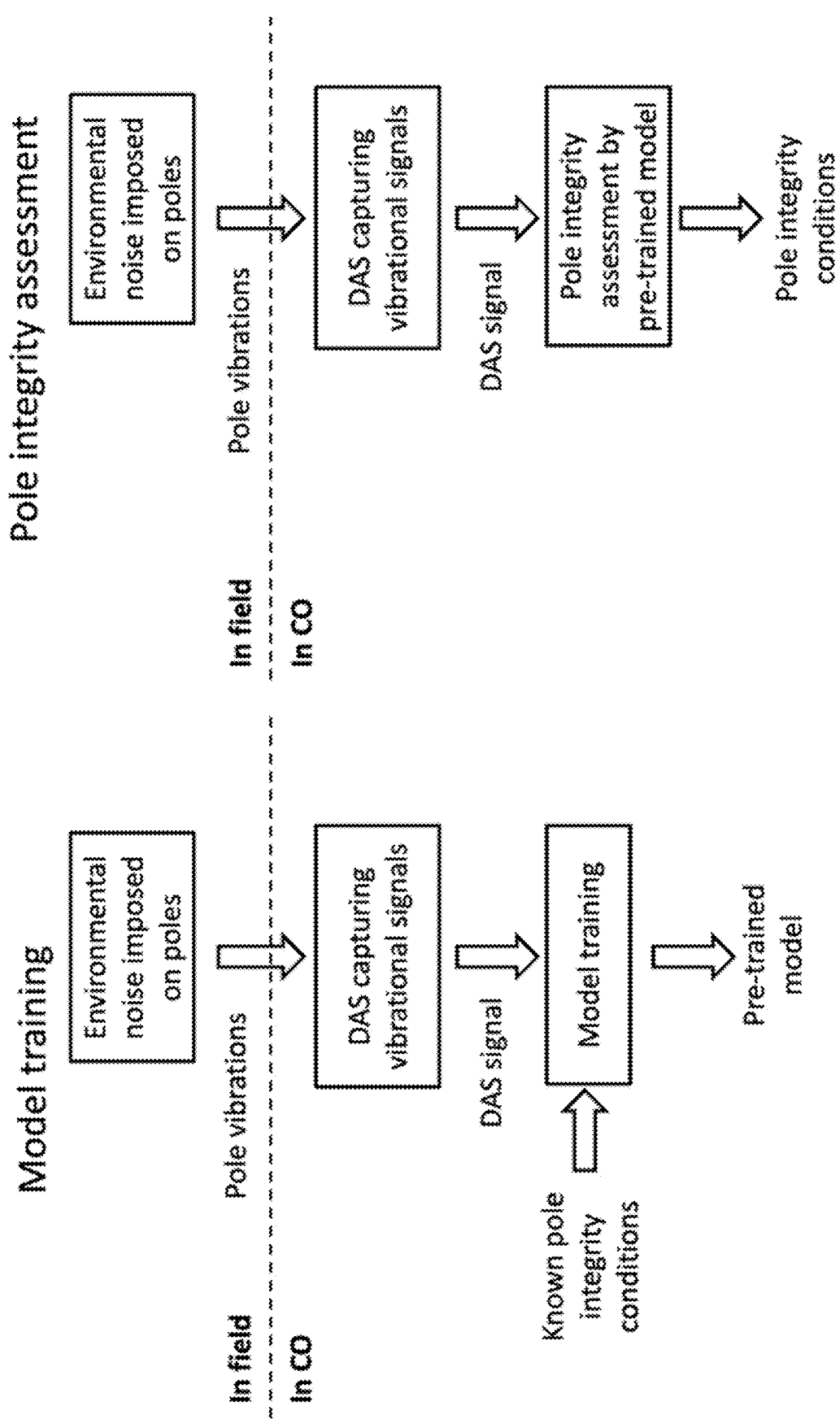
FIG. 2. Is a schematic diagram showing an illustrative operations of model training and utility pole integrity assessment according to aspects of the present disclosure.

FIG. 2. Is a schematic diagram showing an illustrative operations of model training and utility pole integrity assessment according to aspects of the present disclosure. With reference to that figure, we note that to assess pole integrities, a DFOS/DAS interrogator located within a central office (CO) and optically connected to one end of an optical fiber sensor cable, continuously interrogates the optical fiber sensor cable, and detects strain changes occurring along the length of the optical fiber sensor cable resulting from environmental activity including vibrational activity of the utility poles suspending the optical fiber sensor cable.

Deployed in the field, target utility poles are constantly vibrated by "environmental noise" produced by random events occurring in the surrounding environment, such as weather, traffic, seismic events, construction, and other human activities that impart mechanical vibrations on the target utility poles. Since the fiber optic sensor cable is suspended/mounted/fixed onto a pole, the vibration of such pole also induces vibrations in the fiber optic sensor cable suspended/mounted/fixed onto the pole, thereby further inducing strain changes in the fiber optic sensor cable which are detected as DFOS/DAS signals. Such detected signals are stored in a storage server in the Central Office—or other location. The DFOS/DAS interrogator operates—collecting DFOS/DAS vibrational signal data from each pole along the length of the fiber optic sensor cable for a time period. This DFOS/DAS vibrational signal data collection can be either continuous or intermittent.

The stored DFOS/DAS signals are subsequently used for machine learning model training or pole integrity assessment. During model training, the DFOS/DAS signals from target utility poles—together with their known integrity conditions—are used to train the machine learning model. In pole integrity assessment, the DAS signals of target poles are input into the pre-trained machine learning model, and the model outputs those poles' integrity conditions. This process can be repeated multiple times to increase assessment accuracy. Advantageously, a single DFOS/DAS interrogator can capture vibrational data signals from all utility poles in vibrational communication with optical fiber sensor cable suspended therefrom. Of further advantage, DFOS/DAS interrogation and signal capture can be simultaneously performed on multiple utility poles.

Figure 3:
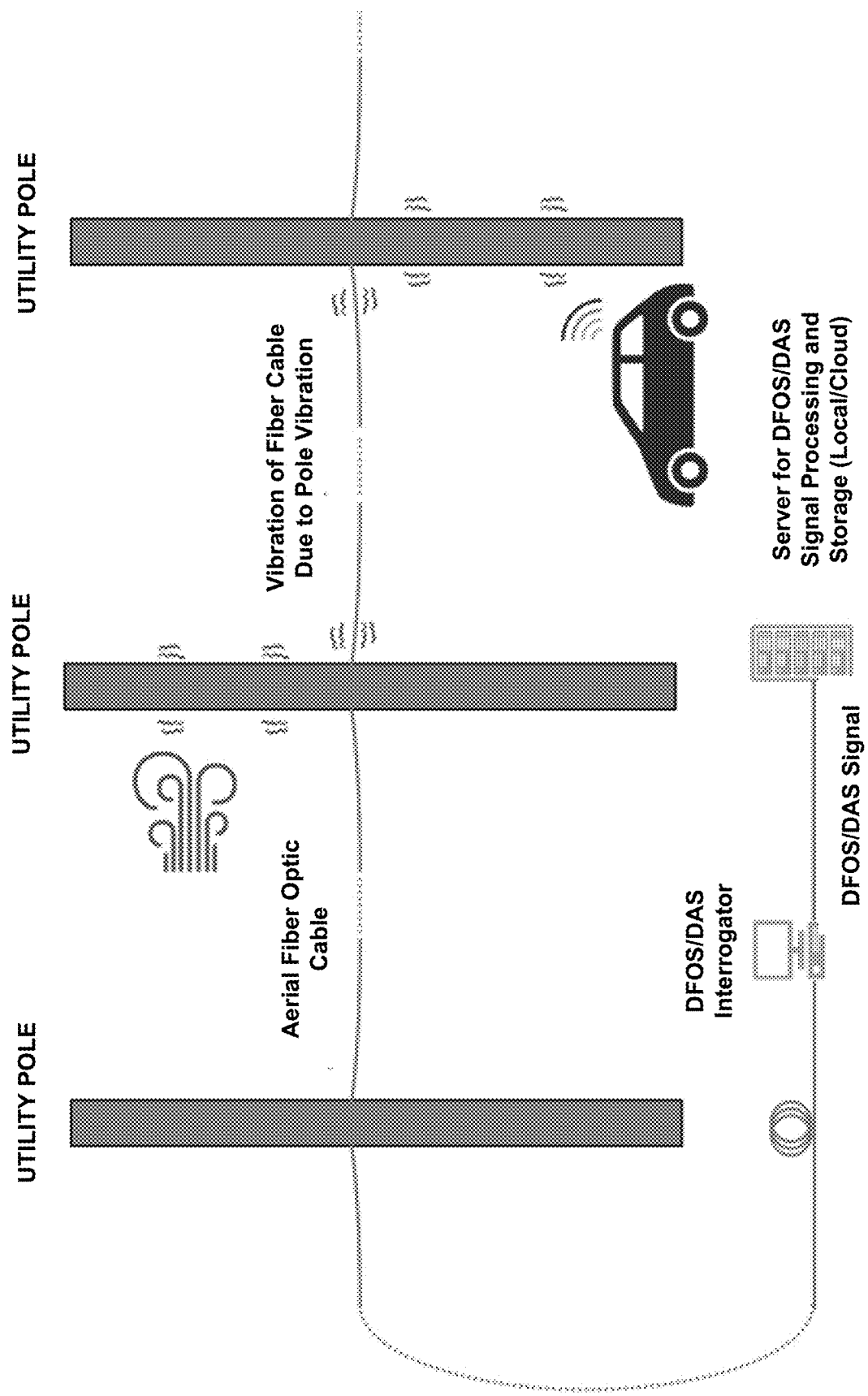
FIG. 3 is a schematic diagram showing illustrative vibration production and DFOS/DAS detection according to aspects of the present disclosure.

FIG. 3 is a schematic diagram showing illustrative vibration production and DFOS/DAS detection according to aspects of the present disclosure. As illustrated in that figure, a series of utility poles are shown suspending an aerial fiber optic sensor cable that is further in optical communication with a DFOS/DAS interrogator.

Due to random environmental conditions such a weather (i.e., wind) or traffic or other vibrational sources not specifically shown, the utility poles respond to such environmental conditions by developing vibrational activity that is further mechanically conducted to the aerial fiber optic sensor cable suspended from the poles. The operational DFOS/DAS interrogates the aerial fiber optic sensor cable and detects strains/stresses induced into the optical fiber sensor cable as DFOS/DAS vibrational signals. Such DFOS/DAS vibrational signals are conveyed to a storage server for DFOS/DAS signal processing including ML model training and subsequent utilization for integrity determination of the utility poles.

An operational procedure summary according to aspects of the present disclosure may be described as follows.

Connect the DFOS/DAS interrogator to an end of the fiber optic sensor cable and operate the interrogator to detect any optical fiber sensor cable vibrations and record them as DFOS/DAS signals.

Record ambient DFOS/DAS vibration signals received from optical fiber sensor cable segments proximate to each target utility pole by the DFOS/DAS interrogator. In a representative operation, the length of time DFOS/DAS vibration data is recorded from each pole is usually two hours or longer and may be continuous or intermittent. As previously noted, DFOS/DAS vibrational data recording from individual utility poles can be performed either simultaneously or individually.

To train a model for pole integrity assessment, the DFOS/DAS vibration data collection must be performed on multiple utility poles having known integrity conditions. DFOS/DAS signals from these "known" utility poles and their integrity conditions are used to train a machine learning model for utility pole integrity condition classification. This generates a pre-trained model for utility pole integrity assessment. Advantageously, any utility poles exhibiting known integrity conditions and employed in the ML model training may be located in different fiber routes that are geographically separated from one other.

Once the ML model is pre-trained and ready, received DFOS/DAS signals resulting from any of the utility poles under test can be fed into the pre-trained model. The pre-trained model is advantageously able to classify the received DFOS/DAS signals into different pole integrity condition classes. In this inventive manner, the integrity conditions of the test poles are obtained. Once the model is pre-trained, additional training may not be necessary.

Figure 4:
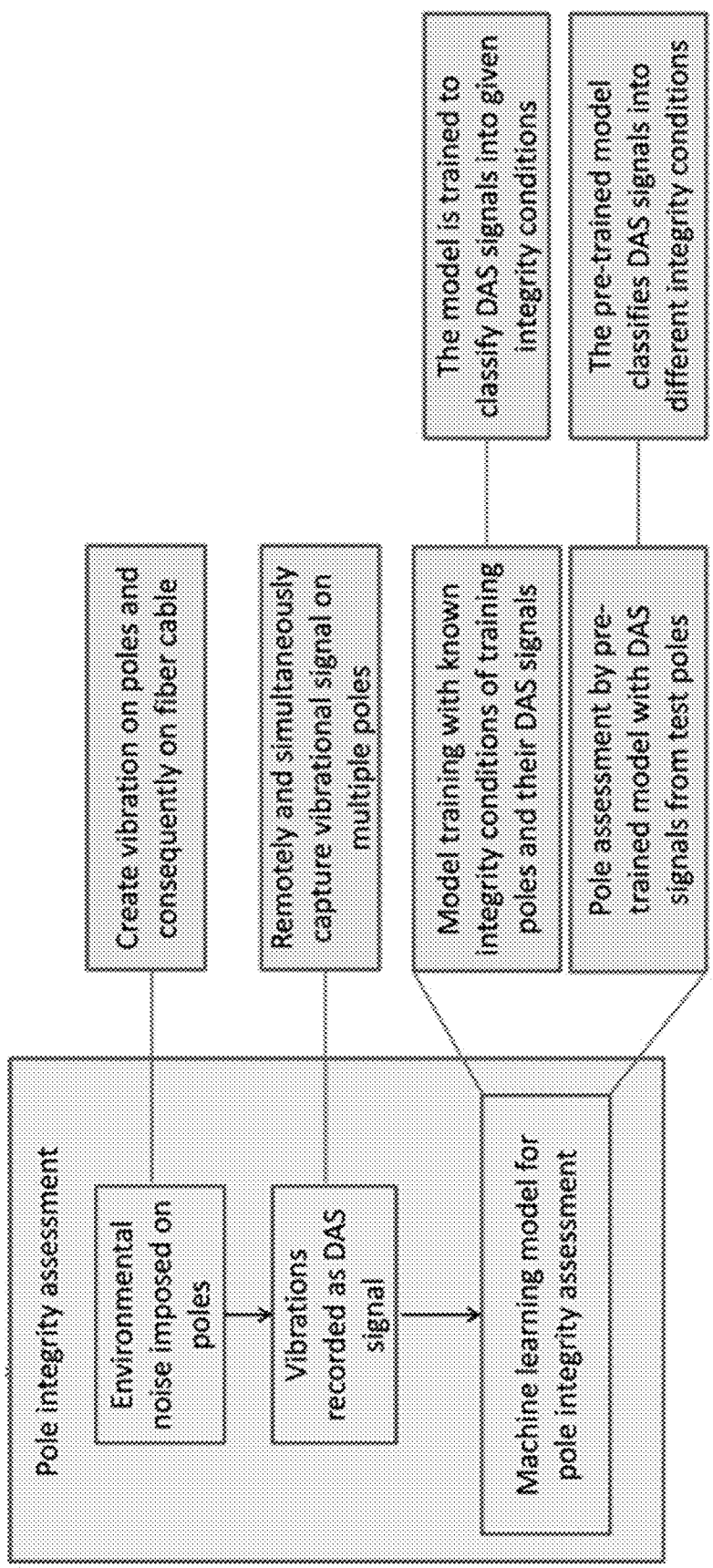
FIG. 4 is a schematic diagram showing illustrative operational features of systems and methods for utility pole integrity assessment according to aspects of the present disclosure.

FIG. 4 is a schematic diagram showing illustrative operational features of systems and methods for utility pole integrity assessment according to aspects of the present disclosure.

Figure 5:
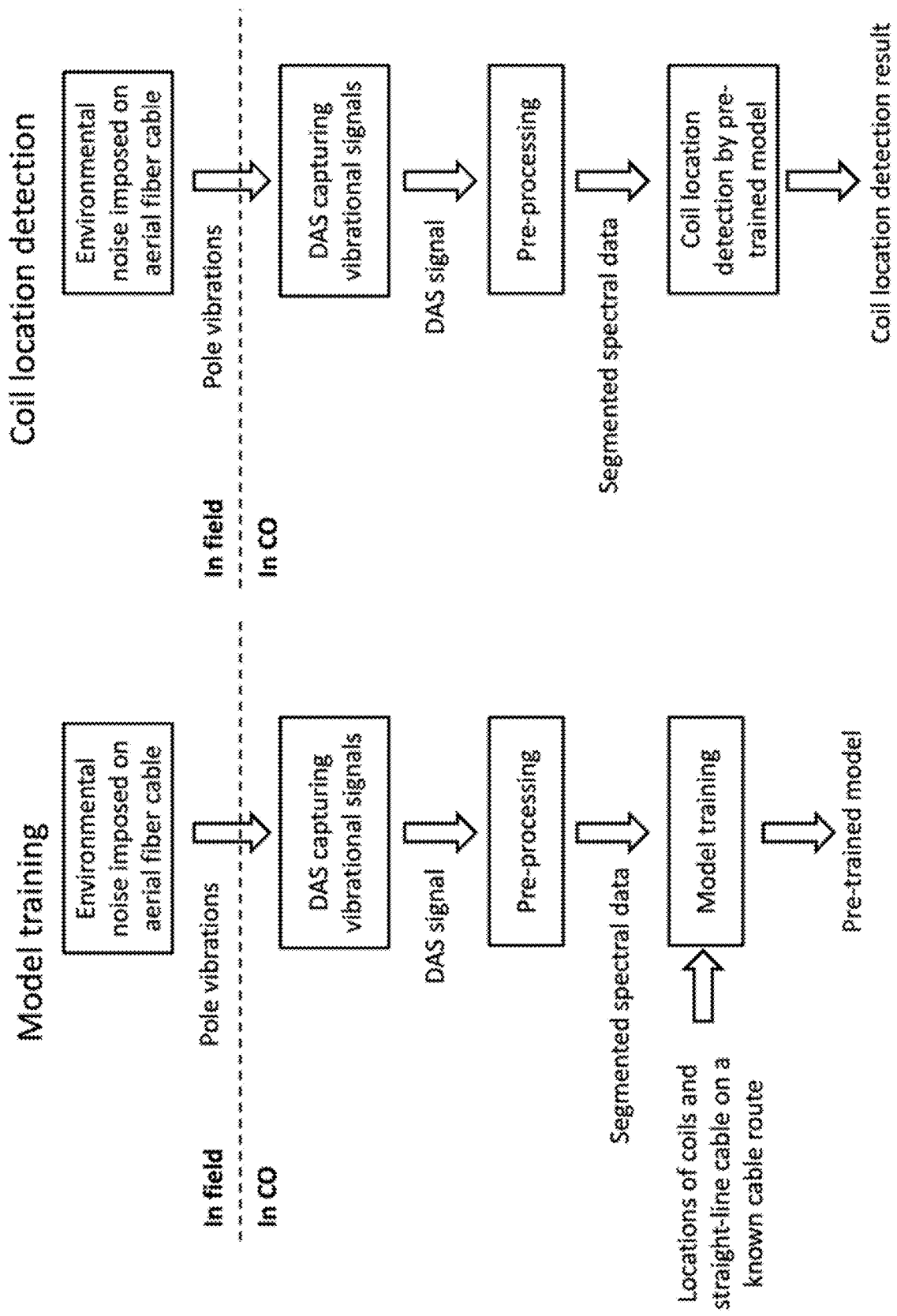
FIG. 5 is a schematic diagram showing illustrative operations of model training and coil location detection according to aspects of the present disclosure.

FIG. 5 is a schematic diagram showing illustrative operations of model training and coil location detection according to aspects of the present disclosure.

To detect coil locations and lengths, a DFOS/DAS interrogator located inside a central office (CO) is optically connected to a near end of an optical fiber sensor cable and continuously interrogates and monitors strain changes occurring along the length of the optical fiber sensor cable. The fiber optic sensor cable experiences constant vibrations induced by environmental noise resulting from random events occurring in the surrounding environment, such as weather, seismic, traffic, construction, and other human activities—among others. The vibrations are received by the operating DFOS/DAS interrogator as vibrational signals from locations along the length of the fiber optic sensor cable and are subsequently stored in a storage server located in the CO. The DFOS/DAS interrogator collects such vibrational signal data from locations along the length of the fiber optic sensor cable for a time-period. Such data collection can be either continuous or intermittent.

The stored DFOS/DAS signals are pre-processed using a short-time Fourier transform and transformed into segmented spectral data. The transformed segmented spectral data are employed to present DFOS/DAS signal spectral features to a machine learning model.

If, during a model training procedure, the segmented spectral data from each location along the length of the fiber optic sensor cable—together with identification of whether a corresponding location is part of a coil of fiber or straight-line fiber optic cable—are used for machine learning model training to distinguish coil locations from straight-line cable locations.

In a coil location detection procedure, the segmented spectral data are input into the pre-trained coil location detection model, and the trained model outputs whether each location on the target cable is part of a coil or a straight-line fiber. Thus, we can know which portions of the target cable are coils, and consequently know their locations and lengths on the target fiber optic sensor cable.

Figure 6:
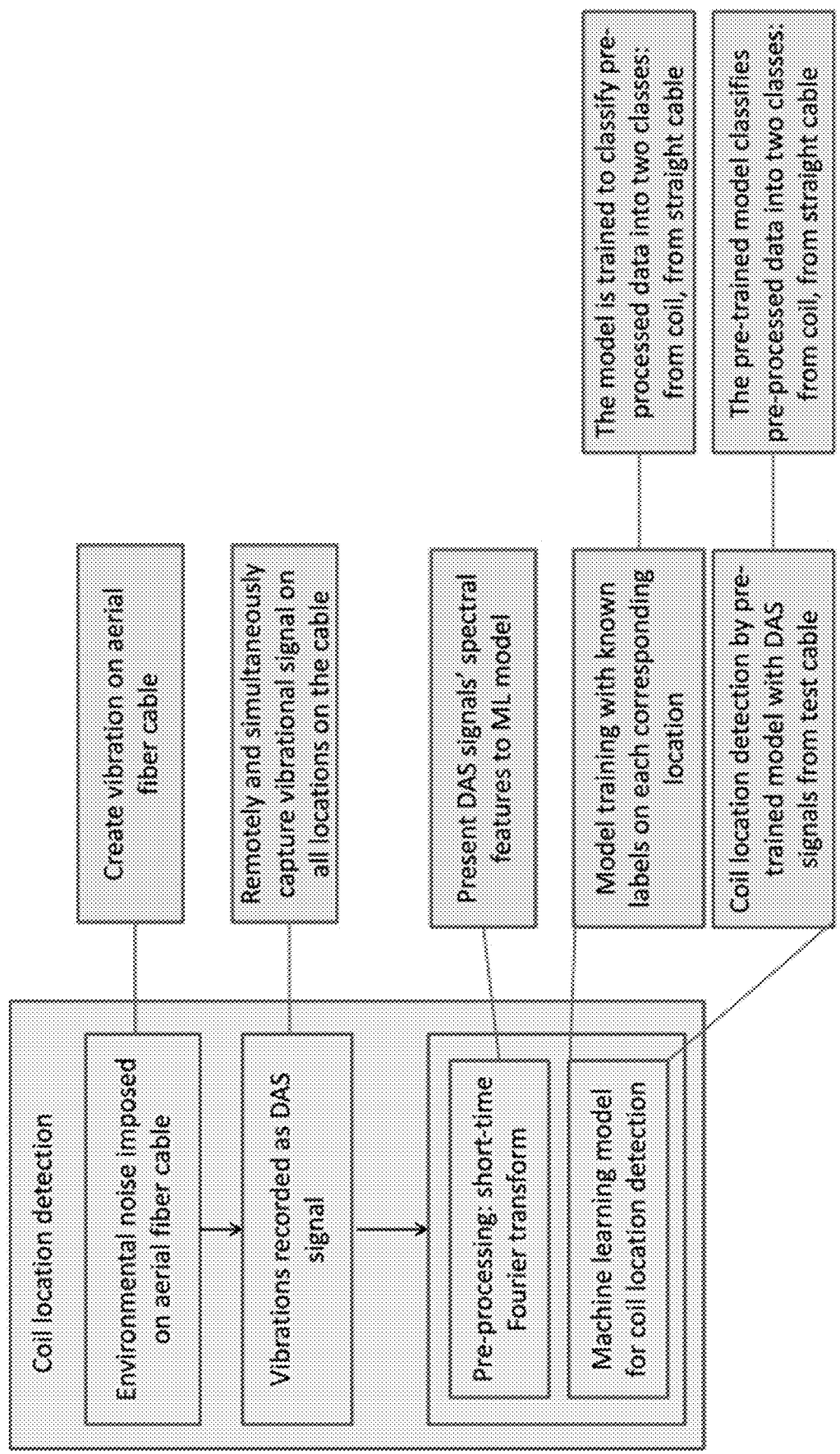
FIG. 6 is a schematic diagram showing illustrative operational features of systems and methods for fiber coil location detection according to aspects of the present disclosure.

FIG. 6 is a schematic diagram showing illustrative operational features of systems and methods for fiber coil location detection according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of determining coil locations and lengths of an optical fiber cable using distributed fiber optic sensing (DFOS) system, the method comprising:
   providing the DFOS system including
      a length of optical sensor fiber, at least a portion of the length of optical sensor fiber being coiled;
      an optical interrogator in optical communication with the length of optical sensor fiber, the optical interrogator configured to generate optical pulses from laser light, introduce the pulses into the optical sensor fiber and receive backscattered signals from the optical sensor fiber, wherein the backscattered signals received originate at locations of the length of optical sensor fiber and result from environmental activities occurring at the locations of the length of the optical sensor fiber;
      an analyzer configured to store and analyze the backscattered signals received from locations along the length of the optical sensor fiber;
   operating the optical interrogator for a predetermined time and storing the backscattered signals received from the locations along the length of the optical sensor fiber;
   pre-processing the stored backscattered signals using a short-time Fourier transform such that transformed segmented spectral data for the locations along the length of the optical sensor fiber is produced;
   training a machine learning model using the transformed segmented spectral data for the locations along the length of the optical sensor fiber together with identification of whether a corresponding location is part of a coil of optical fiber sensor or straight-line optical fiber sensor;

operating the optical interrogator in a coil location detection mode and generate detection mode backscattered signals for locations along the length of the optical fiber sensor, transform the detection mode backscattered signals into detection transformed segmented spectral data for locations along the length of the optical fiber; and determining, from the trained machine learning model and the transformed segmented spectral data for locations along the length of the optical fiber, any locations along the length of the optical fiber sensor including a coil of optical fiber sensor.

2. The method of claim 1 wherein the lengths of any coil of optical fiber sensor are determined, from the trained machine learning model and the transformed segmented spectral data.

3. The method of claim 1 wherein the operating of the optical interrogator for a predetermined time is a continuous operation.

4. The method of claim 1 wherein the operating of the optical interrogator for a predetermined time is an intermittent operation.

5. The method of claim 1 wherein the DFOS system is a distributed acoustic sensing (DAS) system.

\* \* \* \* \*